United States Patent [19]

Gruodis

[11] 4,026,425
[45] May 31, 1977

[54] ARTICLE COLLECTION APPARATUS

[75] Inventor: Romualdas K. Gruodis, Mount Airy, Md.

[73] Assignee: Fairchild Industries Inc., Germantown, Md.

[22] Filed: May 13, 1975

[21] Appl. No.: 577,043

[52] U.S. Cl. .......................... 214/16 B; 193/2 R; 198/359; 198/568; 198/569; 214/6 M
[51] Int. Cl.² ...................................... B65G 47/46
[58] Field of Search ............... 214/6 D, 6 M, 16 B, 214/152; 198/38, 43, 50, 65, 66, 68, 75, 359, 568, 569; 193/2 R, 2 A, 8, 22, 34; 221/119, 121, 123, 130, 133; 209/74

[56] References Cited

UNITED STATES PATENTS

| | | | |
|---|---|---|---|
| 759,922 | 5/1904 | Schwab | 193/8 X |
| 1,736,918 | 11/1929 | Kennedy | 193/8 |
| 1,757,416 | 5/1930 | Cowley et al. | 198/38 X |
| 3,147,845 | 9/1964 | Harrison et al. | 198/38 |
| 3,207,262 | 9/1965 | Berman | 198/38 X |
| 3,250,431 | 5/1966 | Brown | 221/123 |
| 3,265,244 | 8/1966 | Brown | 221/123 X |
| 3,575,316 | 4/1971 | Bianchi | 221/133 |
| 3,674,143 | 7/1972 | Hunter et al. | 209/74 |
| 3,937,456 | 2/1976 | Gruodis et al. | 193/8 X |

Primary Examiner—L. J. Paperner
Attorney, Agent, or Firm—Michael W. York

[57] ABSTRACT

An apparatus for collection of articles at the discharge ends of article sorting machines, particularly a plurality of sorting machines that are arranged one above the other in elevation, and where it is desired to collect articles discharged by the multiple sorting machines at common collection points without causing damage to the articles. The article collection apparatus includes a slide which accepts articles discharged from a plurality of article sorting machines that are arranged in elevation one above the other, and guides the articles discharged from the plurality of sorting machines such that the articles are caused to follow a path that is in a direction essentially opposite to the direction of the sorting machines' transport movement and at an angle of substantially forty degrees to the horizontal, thereby causing the initial velocity imparted to the articles by the discharge action of the sorting machines to be reduced to zero, and also thereby permitting articles discharged from the plurality of sorting machines arranged one above the other to enter a common slide. The end terminus of the slide is shaped to discharge the articles horizontally into a free fall trajectory. A flexible barrier located in the path of the article trajectory causes the velocity of the articles to be reduced to zero. Beneath the flexible barrier there is a collection receptacle that receives the articles which drop after impacting the flexible barrier. The collection container may have a door located at the bottom that, when opened, permits the articles to drop onto a conveyance means for transporting the articles away from the sorting machines.

10 Claims, 7 Drawing Figures

ARTICLE COLLECTION APPARATUS

BACKGROUND OF THE INVENTION

In the process of sorting articles by means of sorting machines there are cases where it is desirable to sort the articles at a very high rate to a fixed number of separations. The rate at which articles can be sorted is a function of the velocity of the sorting machine transport conveyor and the distance between articles on the transport conveyor. A practical limit to the sorting rate is reached when the velocity of the sorting machine transport conveyor is at a value beyond which it is not possible to load the articles onto the sorting machine transport conveyor and the distance between articles on the conveyor are at their minimum distance. When the limit is reached it is then necessary to employ one or more additional sorting machines to achieve the desired sorting rate.

The practice of employing two or more sorting machines that sort articles on the basis of the same separation identity criterion does not provide economical use of floor space and operating personnel unless the multiple sorting machines are arranged one above the other and designed in a way such that the sorting machines discharge to common article collection points. Various types of designs have been proposed to accomplish this end. In general, however, prior arrangements have been unduly complicated, non-efficient in the use of space, costly to manufacture, and cause for damage to fragile articles.

According to the present invention, a simple and efficient means is provided to collect articles from a plurality of article sorting machines arranged one above the other such that the articles to be separated by the plurality of sorting machines may be collected by like kind of articles in common collection receptacles, without subjecting the articles to rough handling, and with maximum efficient use of space.

SUMMARY OF THE INVENTION

This invention relates to apparatus for the collection of articles and more particularly to apparatus for the collection of articles without damaging the articles.

An important object of the present invention is to provide a new and improved article collection slide which reverses the direction of motion of articles as they are discharged from a plurality of sorting machines arranged one above the other, and which path is in a line in said plane which line is at an angle of substantially 40° to the horizontal, and thereby permitting articles diverted from each level of the tiered sorting machines to enter common paths which are arranged to be in proximity to one diverter on each tier of the multiple sorting machines, the diverters thus serviced being in diagonal relationship to one another.

Another object of the invention is to provide an apparatus with a collection slide which has a slope which is determined by a particular relationship.

A further object of the invention is to provide a new and improved article collection slide which reduces damage to fragile items by shaping the discharge of the slide so that the articles are directed to impact a flexible barrier in a horizontal free-fall trajectory, thus removing all velocity imparted to the article by sliding down the slide.

Still another object of the invention is to provide a new and improved collection receptacle at the discharge end of the slide.

A further object of the present invention is to provide a new and improved collection slide wherein the common slide serving all tiers of a plurality of sorting machines is constructed of light-weight injection molded plastic segments, there being one segment for each tier of the plurality of sorting machines, which segments are easily individually removable for rapid access to a sorting machine in case maintenance of a sorting machine is required.

Another object of the invention is to provide an article collection apparatus for collecting articles in which the velocity of the articles are reduced to prevent or reduce damage to the articles.

The present invention provides an apparatus for collecting articles from various elevations from conveyors and transporting the articles down an inclined slide in a direction opposite the direction of motion of the conveyors while slowing down the velocity of the articles. These articles are conveyed down the slide to a common collection location.

BRIEF DESCRIPTION OF THE DRAWINGS

The invention will be hereinafter more fully described with reference to the accompanying drawings in which.

DETAILED DESCRIPTION OF THE PREFERRED EMBODIMENT

Figure 1:
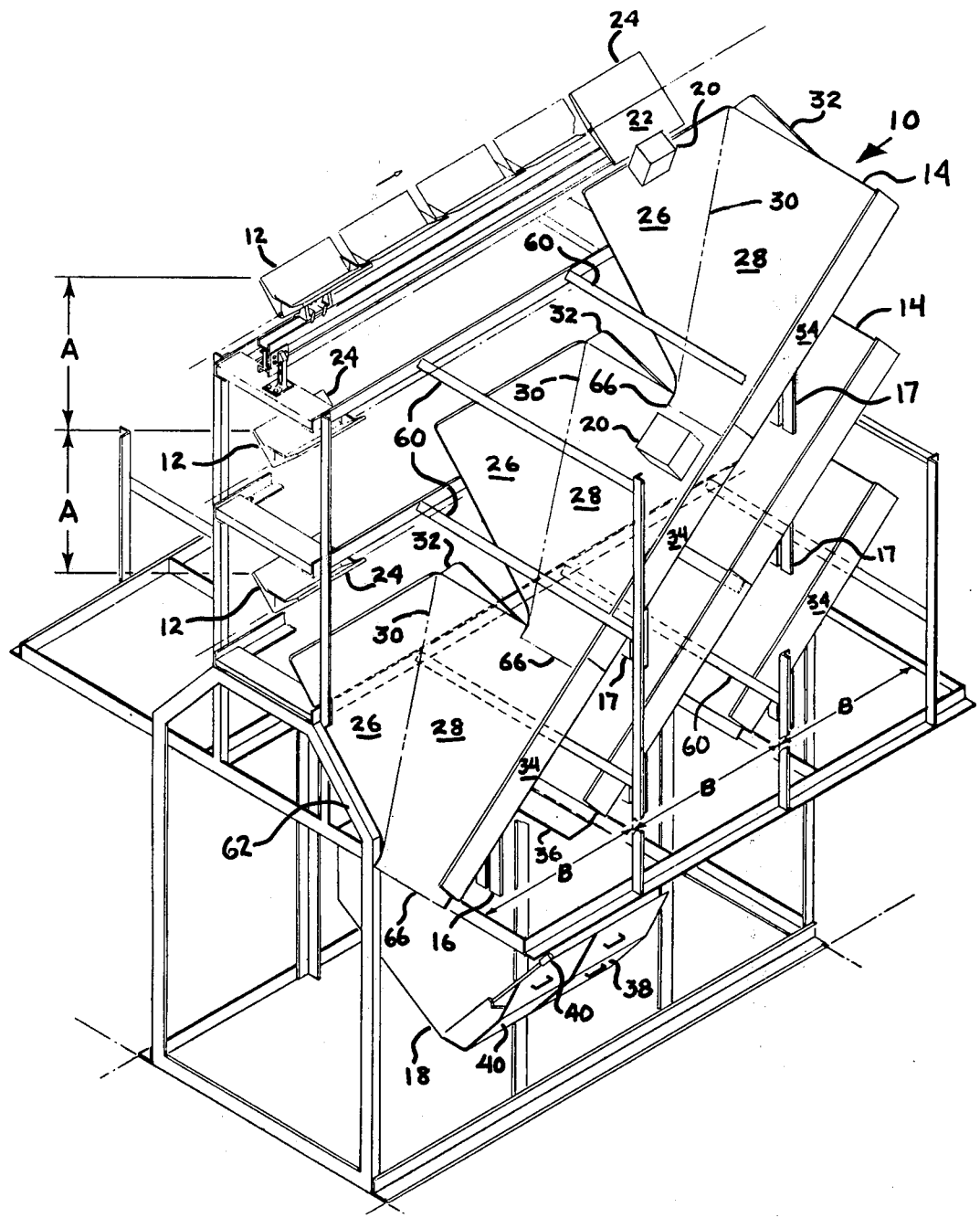
FIG. 1 is a perspective view of the article collection apparatus of the present invention, shown arranged with three sorting machines arranged one above the other.

Referring first to FIG. 1, the collection apparatus of the present invention is illustrated and is generally designated by the number 10. The collection apparatus 10 comprises multiple tiers or sorting machine transport conveyors 12, multiple collection slides 14, flexible barriers 16 and 17, and collection receptacles 18. There may be any number of sorting machine transport conveyors 12 arranged one above the other.

The collection slides 14 are arranged parallel to the sorting machine transport conveyors 12 and at a diagonal to the vertical as shown by FIG. 1. The angle of the diagonal with the vertical is a function of the elevation distance A between the various tiers of the sorting machine transport conveyors 12 and the pitch distance B between article collection receptacles 18. The slope of the collection slide 14 is thus an angle whose tangent is equal to distance A divided by distance B. Where distance A is the vertical distance between the tiered conveyors measured at common points for each conveyor and distance B is the horizontal distance measured between common points for each collection receptacle 18.

The collection slide 14 is comprised of as many collection slide segments 34 as there are tiers of the sorting machine transport conveyors 12. At the lower portion of each bottom collection slide segment 34 a ski shaped fairing 36 is attached which causes the articles 20 to follow a horizontal free fall trajectory and impact flexible barrier 16 such that the articles 20 lose all horizontal motion and drop into collection receptacle 18 starting from zero initial velocity.

Flexible barriers 17 are installed on each of the upper collection slide segments 34 of collection slide 14 in the same manner that flexible barrier 16 is attached, each collection slide segment being identically constructed for economy of production and for interchangeability. The function of flexible barriers 17 is to reduce the velocity of articles 20 while they are sliding down collection slides 14.

There is one collection receptacle 18 installed with each collection slide 14. By choice of the proper slope of the collection slide 14, previously defined as angle whose tangent is distance A divided by distance B, it is readily apparent that articles 20 may be discharged into any desired single receptacle from a plurality of tiered sorting machine transport conveyors 12 by causing the articles 20 to be discharged from the sorting machine transport conveyors 12 at the proper time so as to enter the selected collection slide 14. The techniques for causing articles to be discharged from sorting machines or conveyors 12 at preselected locations are well known in the art and are not material to the present invention. Collection receptacles 18 are equipped with two multihinged doors each of which door 38 can be released individually by operating release handle 40. The purpose of the collection receptacle 18 configuration will be discussed hereafter.

The collection apparatus operates and the method of the invention is carried out in the following manner. At pre-selected locations the sorting machine transport conveyors 12, moving in a direction indicated by the arrow of FIG. 1, discharge articles 20 by means such as lowering a side 22 of a V-shaped tray 24, the trays 24 being part of the sorting machine transport conveyors 12. The sorting machine transport conveyors 12 are of a type that are commonly found in article sorting applications and are not material to the invention. Also, the article collection apparatus of the present invention can be used with any type of article sorting machine commonly used in the art.

Upon being discharged from the sorting machine transport conveyor tray 24 the article 20 slides down surface 26 of the collection slide 14 in a direction which is the resultant of the momentum vector imparted to the article 20 by the sorting machine transport conveyor 12 velocity and the acceleration of gravity. At the intersection area 30 between surface 26 and surface 28 of the collection slide 14 the article 20 is caused to change direction by means of the form of the two surfaces. Surface 26 is in a plane substantially defined by two intersecting lines, one of which contains all points on a tier where articles 20 are discharged from sorting machine transport conveyor tray surface 22 on to the particular segment 34 and the second of which is perpendicular to the first line and at an angle to the horizontal of substantially 40°. Surface 28 is in a plane which intersects surface 26 and which contains a line parallel to the vertical plane of the tiered sorting machine arrangement and which line is at a slope angle defined by the function:

Tangent angle = distance $A$/distance $B$

The slope of surface 28 is such that articles 20 are caused to slide generally in a direction opposite to the direction of sorter machine transport conveyor 12 motion.

Therefore, from the above described form of surfaces 26 and 28 it is evident that the initial velocity or articles 20 are essentially at zero at such time as they commence sliding down surface 28 of collection slide 14, thereby alleviating the problem of incurring damage to the articles 20 as a result of high velocity during the article collection process.

By referral to FIG. 1, it is evident that each collection slide segment 34 is identically constructed and joined in an assembly in such a way to form a collection slide 14, and thereby, that articles 20 from multiple tiered sorting machine transport conveyors 12 may enter the collection slides 14 via the appropriate collection slide segment 34. It is also evident by referral to FIG. 1, particularly the arrangement of surfaces 26 and 28, that the form of each collection slide segment is configured in a way such that there is little likelihood of articles 20 which enter the collection slide 14 at different elevation points becoming jammed or wedged in the collection slide, as may be the case with prior article collection slides that service more than one sorter machine discharge conveyor.

It is an additional feature of the present invention that at the upper portion of each collection slide segment 34 there is a vertical protrusion 32. The function of the protrusion is to assure that any articles sliding off of the lowered side 22 of the V-shaped tray 24 do not enter the incorrect collection slide 14 because of delay in exiting from the V-shaped tray 24. Delayed articles contact the substantially vertical protrusion 32 and re-bound backward into the appropriate collection slide 14. This feature is a failure-corrective or safety measure and is not the normal method whereby articles 20 enter the collection slide segments 34. Articles 20 sliding down the collection slide 14 impact against flexible barriers 17. The flexible barriers 17 are constructed of heavy canvas or similar flexible material and their function is to reduce the velocity of the articles 20 as they slide down the collection slide surfaces 28. At the end of the bottom collection slide segment 34 a ski-shaped fairing 36, whose slope is either horizontal or curved upward, that diverts the articles 20 into a horizontal free-fall trajectory to cause the articles to impact a flexible barrier 16 where the articles lose all forward velocity and drop into collection receptacle 18 only under the influence of gravity.

Figure 2:
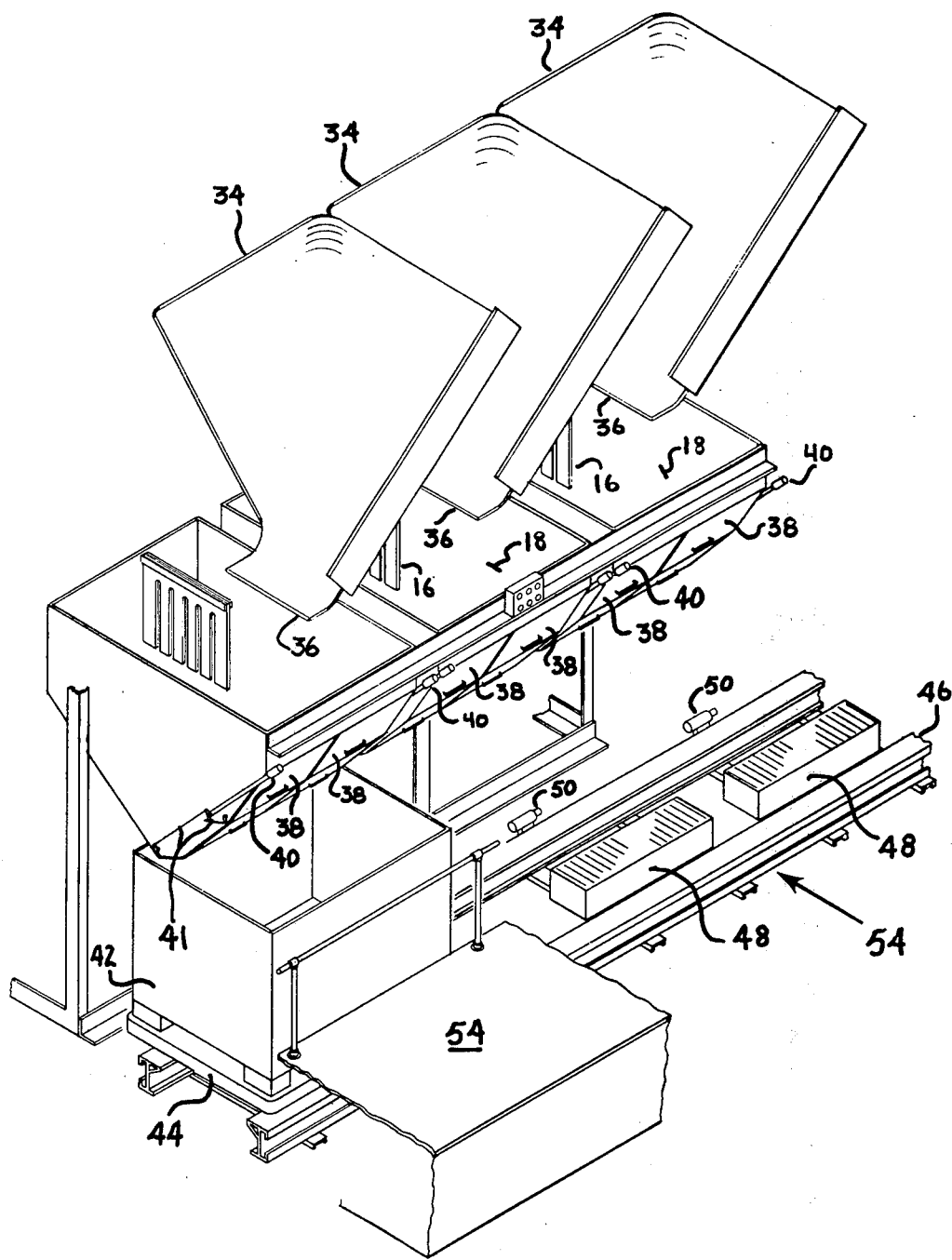
FIG. 2 is a perspective view of the article collection apparatus of the present invention which shows the bottom level of collection slides, flexible barriers, collection receptacles and conveyance means for dispatching the articles away from the collection apparatus.

Referring to FIG. 2, it is shown how means may be adapted to the article collection apparatus 10 of the present invention in order to convey the collected articles 20 away from the plurality of sorting machines. It is an important part of the present invention to note from FIG. 2 and the subsequent description, the compact arrangement of the article collection apparatus which thereby provides major space saving and labor saving improvement over prior means of collecting articles from a plurality of sorting machines.

Illustrated on FIG. 2 is a unit load transport system 52, as available from Boeing Airport Equipment Company, Dallas, Texas. The unit load transport system 52 is not an important part of the present invention since nearly any type of conveyance means can be adapted to suitably function with the article collection apparatus of the present invention. Therefore, a detailed description of the unit load transport system 52 beyond the following is not necessary to understand the operation of the article collection apparatus of the present invention. The unit load transport system 52 is comprised of a wheeled car 44, which has a linear motor armature beneath its chassis, a track 46 to guide the car 44, linear propulsion motor stators 48 which propel the car 44 when the stators 48 are pulsed with electric energy, and pneumatic stops 50 which extend to obstruct forward movement of the car when actuated.

In adaptation of the unit load transport system 52 to the article collection apparatus 10 an empty container 42 is placed on board the car 44. The car 44 is propelled by the stators 48 until it reaches a collection receptacle 18 where it is desired to empty the articles 20 from the collection receptacle 18. At that location the car 44 is halted by a stop 50. An operator standing on platform 54 pushes a release handle 40.

Figure 3:
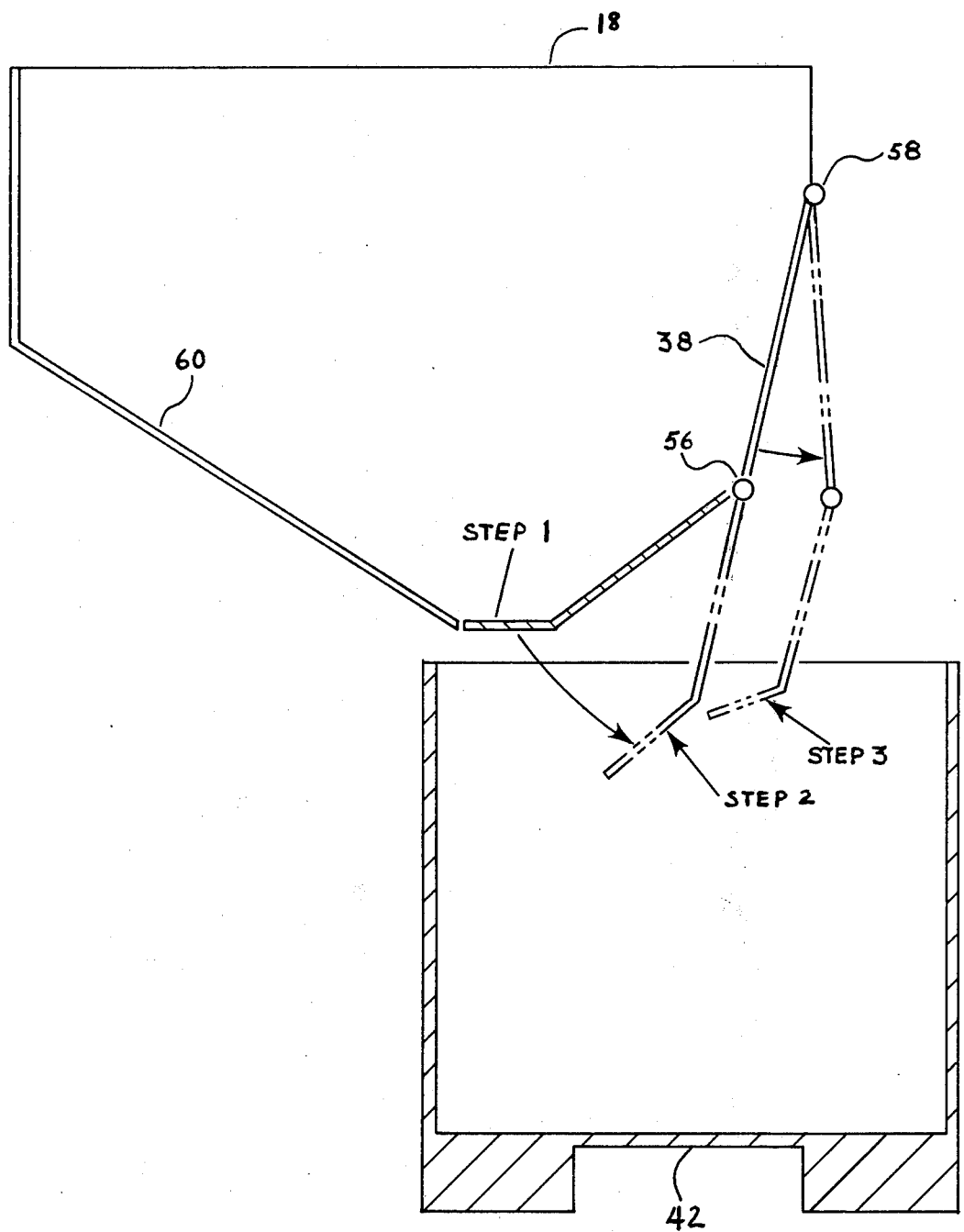
FIG. 3 is a side elevation sectional view of a collection receptacle.

Initial movement of release handle 40 causes by means of a linkage 41 the lower portion of door 38 to be unlatched and rotate about hinge 56. This movement of the lower portion of door 38 is illustrated on FIG. 3 as the transition views step 1 to step 2. With the lower portion of door 38 in the step 2 position articles 20 are permitted to be metered a few at a time into container 42. The mettering action reduces damage to the articles 20 as would otherwise occur if the articles were permitted to fall into container 42 en mass. When the articles 20 have reached a height in container 42 up to the lower portion of door 38 door release handle 40 is pushed further forward and by means of linkage 41 permits door 38 to pivot freely about hinge 58. This movement of the upper portion of door 38 is illustrated on FIG. 3 as the transition views step 2 to step 3. With hinge 58 being free the articles 20 in the collection receptacle are able to slide down incline surface 60 and displace door 38 outward and thus enter container 42. Door 38 acts as a movable retardant to the flow of articles 20 during this step 3 operation, thus the articles 20 enter the container 42 with low velocity and, thereby, damage of fragile articles is prevented.

As shown by FIG. 2 there are two doors 38 for each collection receptacle 18. The purpose of two doors 38 instead of one is to provide a finer degree of control in discharging articles 20 from collection receptacle 18 into container 42; thereby damage to articles 20 is prevented during the operation of filling container 42. A second purpose of providing two doors 38 on collection receptacle 18 is that the door 38 is therefore lighter in weight and is thus more easily closed by the operator who pushes door 38 to latch it after collection receptacle 18 is emptied.

Figure 4:
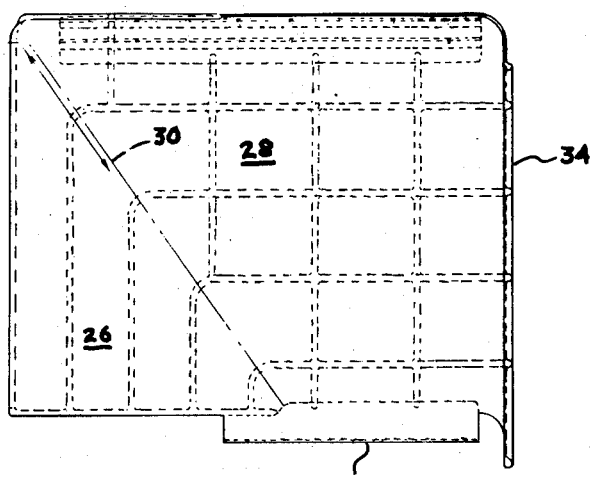
FIG. 4 is a plan view of a segment of the collection slide of the present invention.
Figure 5:
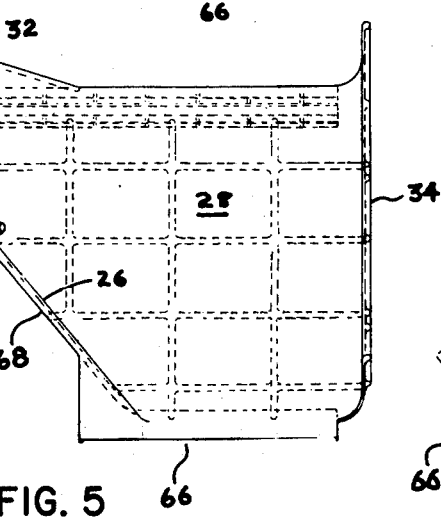
FIG. 5 is a front elevation view of a segment of the collection slide of the present invention.
Figure 6:
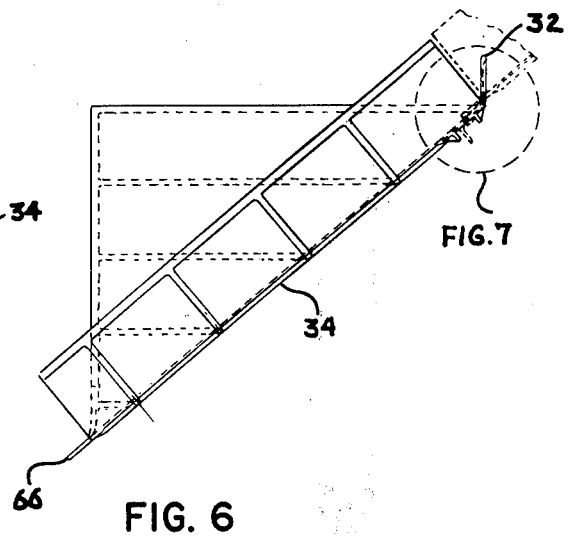
FIG. 6 is a side elevation view of the collection slide of the present invention.

FIGS. 4, 5, and 6 show a plan, front elevation, and side elevation view respectively of collection slide segment 34. The collection slide segment 34 is constructed of plastic by the injection molding process. This inexpensive manufacturing process is possible only because of the relatively small size of the collection slide segment 34 as compared to the size of the complete assembly of the collection slide 14. If the collection slide 14 were made in one piece construction the injection molding process could not be used, but rather more expensive manufacturing processes such as reinforced plastic hand layup or welded metal assembly would have to be used. It is therefore obvious that the collection slide 14 of the present invention provides new improvements in economy of manufacture over prior article collection apparatus where one-piece collection slide construction is used.

Figure 7:
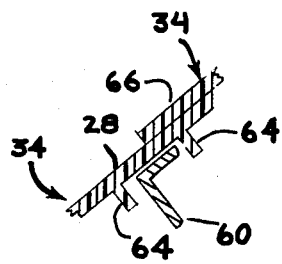
FIG. 7 is an enlarged detail of a portion of FIG. 6 taken within the circle 7 thereof showing the means of attaching the collection slide to the supporting structure of the sorting machine.

Referring to FIG. 4 it will be seen that area of intersection 30 between surface 26 and surface 28 of collection slide segment 34 is a curved surface segment of a cylinder having radius of substantially three inches in the preferred embodiment. This curved surface provides a smooth transition for articles 20 as they slide from surface 26 to surface 28, thus causing the directional change of motion of articles 20 not to be abrupt. At the lower extremity of collection slide segment 34 there is a lip 66. The purpose of lip 66 is to support the lower end of collection slide segment 34 when the collection slide segments 34 are nested on the support structure 60 as shown in FIG. 1. Lip 66 rests on the upper portion of surface 28 of the next lower collection slide segment 34. The upper portion of each collection slide segment 34 rests on support structure 60 as shown by FIG. 1, FIG. 6 and FIG. 7. Referring to FIG. 7 it is seen that each collection slide segment 34 has a channel 64 molded into its underside. The channel 64 rests on support structure 60 thus supporting and restraining the upper portion of collection slide segment 34.

When installing the collection slide 14 the following procedure is observed. First, the lowest collection slide segment 34 is placed into position so that the underside of surface 26, being surface 68 as shown in FIG. 5, is resting on structure member 62, as shown in FIG. 1, and the rear portion of collection slide segment 34 is resting on structure member 60 as shown in FIG. 7. Second, the next lowest collection slide segment 34 is placed in position so that its lip 66 is resting on the upper portion of surface 28 of the lowest collection slide segment 34 and its channel 64 is resting on support structure member 60. The above described procedure is continued for the remaining collection slide segments 34 until a complete collection slide 14 is installed. Of course this procedure can be reversed when it is desired to disassemble the apparatus or one or more of the slides 14. And, since the segments 34 are interchangeable it is easy to replace any segment 34 that needs servicing or repair.

The advantages of this new and improved installation method over prior collection slides are obvious. Installation is rapid in that no fastening is required to join the members of the collection slide and join the collection slide to the support structure. In addition, the collection slides 14, which may be installed on both sides of the sorting machine transport conveyors 12 and thus completely enclose the sorting machine transport conveyors 12, can be easily removed to gain access to the sorting machine transport conveyors for maintenance purposes.

Although the invention has been described in considerable detail with reference to a certain preferred embodiments, it will be understood that variations or modifications may be made within the spirit and scope of the invention as defined in the appended claims.

What is claimed is:

1. An article collection apparatus for use in collecting articles comprising a plurality of conveyors located at different elevations, a plurality of collection slides located adjacent said conveyors, said collection slides comprising stackable collection slide segments, said collection slide segments forming a collection slide having a substantially continuous smooth inclined surface, said collection slide segments having means for changing the direction of articles entering the slide segment from a conveyor, the number of segments forming each of said collection slides being equal to the number of said conveyors, each of said collection slides having means for permitting articles to enter a collection slide from said conveyors at different elevations.

2. The article collection apparatus of claim 1 further comprising means for receiving and holding said collection slide segments and wherein said slide segments have means located thereon for permitting them to be received and held in place by said receiving means without the use of fasteners.

3. The article collection apparatus of claim 2 wherein said retaining means comprises projecting members extending from said slide segments.

4. The article collection apparatus of claim 3 further comprising a flexible barrier installed on the lower bottom portion of each of a plurality of said collection slide segments.

5. The article collection apparatus of claim 1 wherein the interior of said slide segments comprises two inclined planes.

6. The article collection apparatus of claim 5 wherein said slide segment has an upper edge and further comprising means located on said upper edge for assisting in retaining articles in said slide segment.

7. The article collection apparatus of claim 6 wherein said conveyors are tiered vertically and spaced in an equal vertical distance from each other.

8. The article collection apparatus of claim 7 wherein said collection slides are located substantially parallel to said conveyors.

9. The article collection apparatus of claim 7 wherein at least one of the planes of said slide segments is so located that the collection slide has substantially a single common plane for conveyance of articles when said slide segments are located in place to form a collection slide.

10. The article collection apparatus of claim 9 further comprising a collection receptacle located near the lower end of each of a plurality of said collection slides and wherein the inclined plane of said slide segments which form a substantially single common plane for the conveyance of articles when said collection slide segments are located in place to form a collection slide contains a line parallel to the vertical plane of the tiered conveyors and said line is at a slope Angle defined substantially by the following function:

$$\text{Tangent Angle} = \text{Distance } A/\text{Distance } B$$

wherein Distance A is the vertical distance between the tiered conveyor measured at common points for each conveyor and where Distance B is the horizontal distance measured between common points for each collection receptacle.

* * * * *